Patented Feb. 24, 1953

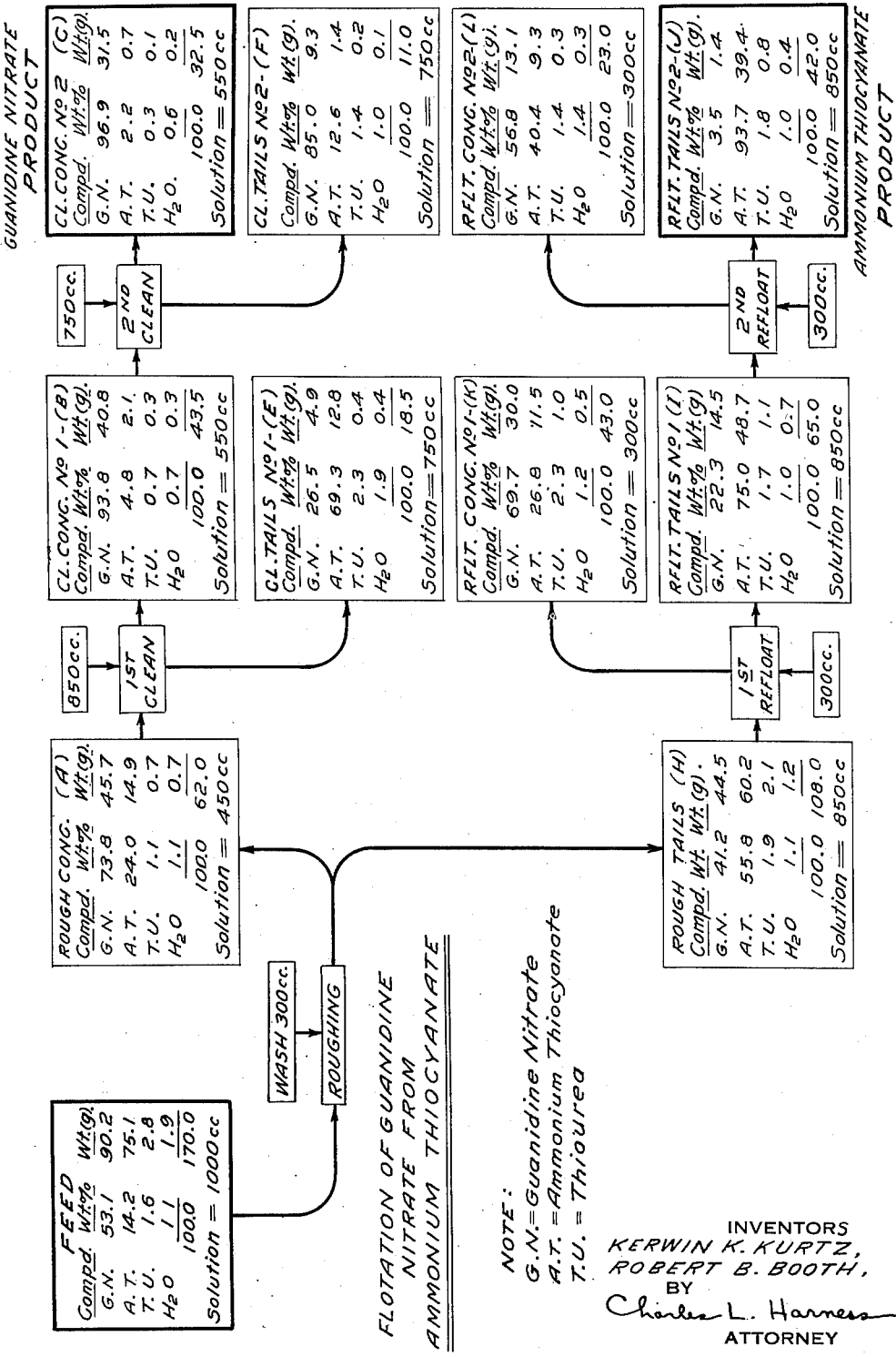

2,629,492

UNITED STATES PATENT OFFICE 2,629,492

FLOTATION OF GUANIDINE SALTS

Kerwin K. Kurtz, Stamford, and Robert B. Booth, Springdale, Conn., assignors to American Cyanamid Company, New York, N. Y., a corporation of Maine Application September 6, 1950, Serial No. 183,436

11 Claims. (Cl. 209—164)

The present invention relates to the separation of guanidine salts from aqueous slurries of the same. More particularly, the invention relates to the separation of guanidine salts from other salts, both organic and inorganic salts, said materials being in the solid phase, finely divided, in an aqueous slurry. Thus the invention contemplates the separation of guanidine salts from salts whose cations and anions are inorganic, organic, or any combination of the same.

Prior methods of preparing guanidine salts by a double decomposition reaction between one guanidine salt and an inorganic salt, for example, the reaction between guanidine hydrochloride and sodium carbonate to produce guanidine carbonate and sodium chloride, have been open to the objection that the total recovery process necessitates fractional crystallization with its accompanying expenditure of heat in warming the mother liquor, and power in refrigerating same. In the present invention it is unnecessary to heat the solution to cause one of the solid components to dissolve therein, and it is likewise unnecessary to cool the solution to cause one of the components to be precipitated therein. The double decomposition consequently may be carried out so as to precipitate both a guanidine salt and an inorganic salt in the solid phase, and thereafter the guanidine salt is floated from the inorganic salt, or the inorganic salt may be floated from the guanidine salt.

The figure is a flow-sheet of the flotation of guanidine nitrate from ammonium thiocyanate.

While in many instances good separations are obtained without the aid of a flotation reagent, in general it is preferred to use one. A large number of flotation reagents are available to effect the separation, as shown in the following example.

EXAMPLE 1

*The flotation of solid guanidine carbonate from an aqueous slurry saturated with respect to guanidine carbonate and sodium chloride*

To 150 cc. of a solution saturated with guanidine carbonate and sodium chloride contained in a small Fagergren flotation machine was added 25 grams of solid guanidine carbonate selected to pass a 35-mesh screen. One drop of flotation reagent (about 0.01 to 0.04 g.) was added and the reagent was agitated in the cell for 15 seconds, after which interval flotation was allowed to take place for 1 minute. The concentrate and tailings were recovered, dried, and weighed and the recoveries calculated.

The results with various flotation reagents are shown in the following tabulation:

| Reagent | Recoveries, Percent | |
|---|---|---|
| | Concentrate | Tailings |
| Octylaldehyde | 98.8 | 1.2 |
| B-23 alcohol | 98 | 2 |
| Dicresyldithiophosphoric acid (crude) | 98 | 2 |
| Castor oil | 97.8 | 2.2 |
| Amyl mercaptan | 97.8 | 2.2 |
| Naphthenic acid | 97 | 3 |
| Phosphorated castor oil | 97 | 3 |
| Creosote oil | 97 | 3 |
| Sulfonated tall oil | 97 | 3 |
| Fuel oil | 96 | 4 |
| Pine oil | 96 | 4 |
| Cresylic acid | 96 | 4 |
| Ethyl xanthogen ethyl formate | 96 | 4 |
| Sodium diethyldithiophosphate (tech.) | 95.7 | 4.3 |
| Tall oil | 95 | 5 |
| Amyl acetate | 94 | 6 |
| Crude turpentine | 92.8 | 7.2 |
| Dibutyl phthalate | 91 | 9 |
| Secondary butyl alcohol | 90.2 | 9.8 |
| Oil soluble petroleum sulfonate | 90.3 | 9.7 |
| Methyl isobutyl ketone | 89.6 | 10.4 |
| Nitrobenzene | 89.3 | 10.7 |
| Ammonium disecondarybutyl dithiophosphate | 87.2 | 12.8 |
| Aniline oil | 81.5 | 18.5 |
| Water soluble petroleum sulfonate | 81.5 | 18.5 |
| Carbon tetrachloride | 80.4 | 19.6 |
| Sodium secondarybutyl xanthate | 73.3 | 16.7 |
| Sulfonated castor oil | 66.7 | 33.3 |
| Oleic acid | 64 | 36 |
| Sulfonated oleic acid | 59.2 | 40.8 |
| Ethylene glycol mono-oleate | 57.7 | 42.3 |

Some guanidine salts, including the carbonate, can be floated with excellent recoveries without the use of a flotation reagent, provided the slurry is frothed long enough. For example, using no reagent and frothing for one minute, the recovery of guanidine carbonate in one experiment was only 45.5%, whereas after two minutes frothing the recovery was 74.8%.

Among the guanidine salts that can be floated in fair yield without a reagent from their own saturated solutions are the nitrate, acetate, and benzoate, as well as the carbonate already mentioned. Among the guanidine salts requiring a reagent for suitable recoveries from their own saturated solutions are diguanidine phosphate, guanidine citrate, guanidine tartrate, and others.

EXAMPLE 2

*Flotation of various guanidine salts with various reagents*

The floatability of guanidine salts is a general characteristic and is not confined to the carbonate, or even to salts of inorganic acids.

In the following table the guanidine salts listed were floated by adding 25 g. of the salt to 150 cc.

of its saturated solution in a small Fagergren unit, one to four drops (0.01 to 0.04 g. per drop) of the flotation reagent was added, and the flotation separation carried out.

| Run No. | Material | No. of Drops | Reagent | Recoveries, percent | |
|---|---|---|---|---|---|
| | | | | Concentrate | Tailings |
| 217 | Guanidine carbonate | 1 | crude dicresyl dithiophosphoric acid | 98.8 | 1.2 |
| 162 | Guanidine sulfate | 1 | pine oil | 95.3 | 4.7 |
| 226 | Diguanidine phosphate | 1 | crude dicresyl dithiophosphoric acid | 67.6 | 32.4 |
| 152 | Guanidine acetate | 1 | pine oil | 92.3 | 7.7 |
| 159 | Guanidine fumarate | 2 | ___do___ | 85.3 | 14.7 |
| 157 | Guanidine tartrate | 4 | ___do___ | 81.9 | 18.1 |
| 227 | Guanidine citrate | 3 | crude dicresyl dithiophosphoric acid | 81.8 | 18.2 |
| 153 | Guanidine benzoate | 1 | pine oil | 83.3 | 16.7 |
| 160 | Guanidine phthalate | 1 | ___do___ | 86 | 14 |

While solid guanidine salts may be separated from their saturated solutions by flotation, the main utility of the process lies in the separation of guanidine salts in the solid phase from inorganic salts in the solid phase, both being in an aqueous slurry.

SEPARATION OF GUANIDINE SALTS FROM INORGANIC SALTS

EXAMPLE 3

*Flotation of guanidine carbonate from sodium chloride*

In the preparation of guanidine carbonate by the double decomposition reaction of guanidine hydrochloride and sodium carbonate in aqueous solution, precipitates of guanidine carbonate and sodium chloride are formed at room temperature as the solution becomes saturated with the reaction products. Or, if desired, the concentration of dissolved salts may be allowed to build up sufficiently high and the reaction products precipitated out by cooling. The resulting salts may be separated by flotation.

Following this plan, 187 grams (1.75 mols) of sodium carbonate (99% pure) and 344 grams (3.5 mols) of guanidine hydrochloride (96.9% pure) were reacted for 1 hour in 2,320 grams of a saturated solution of guanidine carbonate and sodium chloride. The resultant mixture of guanidine carbonate and sodium chloride was transferred to a standard laboratory Fagergren flotation unit, about 0.08 g. of pine oil was added to the cell, and the slurry subjected to a flotation process consisting of roughing the slurry 5 minutes and then cleaning the rougher concentrate twice for 5 minutes at each pass with the following result:

| Material | Analyses | | Recoveries, percent | |
|---|---|---|---|---|
| | Guanidine Carbonate | NaCl | Guanidine Carbonate | NaCl |
| Final Concentrate | 96.8 | 2.9 | 94.7 | 3.9 |
| Rougher tailing | 3.3 | 94.3 | 1.9 | 83.5 |
| Combined cleaner tailings | 16.6 | 78.3 | 2.0 | 12.3 |

It will be observed that the recovery of 94.7% of guanidine carbonate was obtained, with a carryover of only 3.9% sodium chloride. It will be further noted that the final concentrate analyzed 96.8% guanidine carbonate and only 2.9% salt.

EXAMPLE 4

*Flotation of guanidine carbonate from sodium sulfate*

320 grams (1.72 mols) of guanidine carbonate (97% pure), and 180 grams of sodium sulfate (1.25 mols) were added to 2,320 grams of a saturated solution of the two components, contained in a laboratory Fagergren flotation unit, stirred for 45 minutes, then roughed for 12 minutes with about 0.08 g. of pine oil and cleaned once for 6 minutes. A concentrate analyzing 97.5% guanidine carbonate and 2.5% sodium sulfate was obtained, representing a recovery of 77.1% guanidine carbonate and 3.4% sodium sulfate.

EXAMPLE 5

*Flotation of guanidine carbonate from sodium carbonate*

250 grams of sodium carbonate (99% pure) and 250 grams of 97% guanidine carbonate were added to 2,320 grams of an aqueous solution saturated with both components, then stirred for 4 hours, and roughed with about 0.16 gram of pine oil for 8 minutes, followed by cleaning once for 6 minutes. The final concentrate analyzed 87.2% guanidine carbonate and 11.9% sodium carbonate. The recovery of guanidine carbonate was 95.2% and that of sodium carbonate was 12.6%.

EXAMPLE 6

*Flotation of guanidine nitrate from sodium carbonate*

151 grams of 99% sodium carbonate and 349 grams of 97% guanidine nitrate were added to 2,320 grams of a solution saturated with both components in a laboratory Fagergren unit, as in the preceding examples. The slurry was stirred for 3 hours, and then about 0.08 gram of pine oil was added to it and the slurry was roughed for 4 minutes. Flotation yielded a concentrate analyzing 92% guanidine nitrate and 5.4% sodium carbonate. The recovery of guanidine nitrate was 97.2% and that of sodium carbonate was 12.9%.

EXAMPLE 7

*Flotation of guanidine nitrate from sodium chloride*

162 grams of sodium chloride and 338 grams of 97% guanidine nitrate were added to 2,320 grams of a solution saturated with both components, as in the preceding examples, and stirred for 1 hour. About 0.08 gram of pine oil were added to the slurry, which was then roughed for 2 minutes. The rougher concentrate was refloated after being cleaned once for 3.5 minutes. The final concentrate analyzed 97.1% guanidine nitrate and 1.1% sodium chloride. The overall recovery of guanidine nitrate was 89.9% and that of sodium chloride was 2.1%.

EXAMPLE 8

*Flotation of guanidine nitrate from sodium nitrate*

As in the preceding examples, 250 grams of sodium nitrate and 250 grams of 97% guanidine nitrate were added to 2,320 grams of a saturated solution of the two components in a laboratory Fagergren flotation cell. The cell was stirred for 1 hour, and then about 0.08 gram of pine oil were added and the slurry was roughed for 4 minutes. It was cleaned once for 3 minutes, to yield a final concentrate analyzing 92.8% guanidine nitrate and 7% sodium nitrate. The recovery of guanidine nitrate was 98.4% and that of sodium nitrate was 7.2%.

EXAMPLE 9

The separation of various other salt pairs, including guanidine salts from potassium and ammonium salts, is demonstrated in the accompanying table. In the following runs, 25 parts of the solid guanidine salt plus the stated amount of the solid inorganic salt were added to a solution saturated with both components, the flotation reagent added, and the materials floated in the small Fagergren unit. No cleaning steps were used.

EXAMPLE 10

*Flotation of solid guanidine carbonate from solid sodium chloride with various reagents*

In Examples 3–8 pine oil was chosen as the reagent for floating the guanidine salt, but numerous other reagents are as good or better. The influence of other reagents on recovery and purity, in elaboration of Example 3, is shown in the accompanying table.

In the following runs, solid guanidine carbonate and solid sodium chloride were added to a solution saturated with both components, one drop (0.01 to 0.04 gram) of the flotation reagent added and the material roughed for two minutes in the small Fagergren unit without subsequent cleaning.

| Run No. | Parts by wt. | | Flotation Reagent | | Analyses, Percent | | Recoveries, Percent | |
|---|---|---|---|---|---|---|---|---|
| | Guanidine Carbonate | NaCl | | | Guanidine Carbonate | NaCl | Guanidine Carbonate | NaCl |
| 246 | 25 | 18.2 | Pine oil | Conc. | 92.2 | 7.4 | 97.8 | 10.6 |
| | | | | Tailing | 1.7 | 97.1 | 2.2 | 89.4 |
| 247 | 25 | 20.5 | B-23 alcohol | Conc. | 93.4 | 5.5 | 99.3 | 7.1 |
| | | | | Tailing | 0.9 | 97.2 | 0.7 | 92.9 |
| 248 | 25 | 13.2 | crude dicresyl dithiophosphoric acid | Conc. | 91.9 | 6.9 | 99.2 | 9.8 |
| | | | | Tailing | 1.2 | 96.8 | 0.8 | 90.2 |
| 249 | 25 | 16 | naphthenic acid | Conc. | 93.5 | 5.4 | 92.7 | 8.4 |
| | | | | Tailing | 11.0 | 88.7 | 7.3 | 91.6 |
| 250 | 25 | 18.5 | sulfonated tall oil | Conc. | 93.6 | 5.5 | 98.2 | 7.7 |
| | | | | Tailing | 2.4 | 96.3 | 1.8 | 92.3 |
| 251 | 25 | 20 | sodium secondary butyl xanthate | Conc. | 92.3 | 6.6 | 97.0 | 8.5 |
| | | | | Tailing | 3.8 | 95.0 | 3.0 | 91.5 |
| 252 | 25 | 20.7 | amyl acetate | Conc. | 90.5 | 8.3 | 98.1 | 10.9 |
| | | | | Tailing | 2.6 | 96.1 | 1.9 | 89.1 |
| 255 | 25 | 20.4 | sodium diethyl dithiophosphate | Conc. | 92.3 | 6.3 | 93.1 | 7.8 |
| | | | | Tailing | 8.4 | 91.4 | 6.9 | 92.2 |
| 254 | 25 | 21.6 | none | Conc. | 92.4 | 6.8 | 92.8 | 7.9 |
| | | | | Tailing | 8.2 | 91.0 | 7.2 | 92.1 |

EXAMPLE 11

*Flotation of guanidine nitrate from ammonium thiocyanate*

In the methathetical reaction of ammonium nitrate and a mixture of guanidine thiocyanate, ammonium thiocyanate and a little thiourea, the resultant solids comprise guanidine nitrate, ammonium thiocyanate, and thiourea. Prior to

| Run No. | Reagent | No. of Drops | Guanidine Salts | Inorganic Salt | |
|---|---|---|---|---|---|
| | | | | Nature | Parts |
| 238 | Pine oil | 1 | Guanidine nitrate | $Na_2SO_4$ | 22.6 |
| 239 | Crude dicresyl dithiophosphoric acid | 4 | Diguanidine phosphate | NaCl | 24.2 |
| 240 | do | 5 | Guanidine sulfate | $(NH_4)_2SO_4$ | 15 |
| 241 | do | 6 | do | $Na_2SO_4$ | 11.2 |
| 253 | Pine oil | 1 | Guanidine carbonate | KCl | 18.6 |

| Run No. | | Analyses, Percent | | Recoveries, Percent | |
|---|---|---|---|---|---|
| | | Guanidine Salt | Inorganic Salt | Guanidine Salt | Inorganic Salt |
| 238 | Conc. | 84.9 | 14.2 | 98.7 | 19.1 |
| | Tailing | 1.77 | 97.4 | 1.3 | 80.9 |
| 239 | Conc. | 87.5 | 12.5 | 89.0 | 13.2 |
| | Tailing | 11.4 | 86.8 | 11.0 | 86.7 |
| 240 | Conc. | 84.3 | 11.1 | 92.9 | 20.4 |
| | Tailing | 12.1 | 81.0 | 7.1 | 79.6 |
| 241 | Conc. | 89.3 | 8.83 | 94.8 | 20.9 |
| | Tailing | 12.2 | 83.3 | 5.2 | 79.1 |
| 253 | Conc. | 95.4 | 3.8 | 98.5 | 5.2 |
| | Tailing | 2.0 | 96.9 | 1.5 | 94.8 | the present invention no practicable means was known to separate guanidine nitrate from this mixture. The instant example shows how the separation may be effected by flotation.

To an aqueous solution at 25° C. saturated with respect to guanidine nitrate, ammonium thiocyanate, and thiourea was added solid feed consisting of 90.2 g. of guanidine nitrate, 75.1 g. of ammonium thiocyanate, and 2.8 g. of thiourea. (See the figure.) The feed carried in addition 1.9 g. of adsorbed water, giving a total feed weight of 170.0 g. The slurry was placed in a 1.5 liter Fagergren laboratory flotation machine and roughed for 5 minutes at 25° C., using a few drops of pine oil. During the roughing, 300 cc. of liquor saturated with respect to guanidine nitrate, ammonium thiocyanate, and thiourea, was added as a wash. (In the figure, wash liquor will be understood to be such saturated liquor.) The rougher concentrate (referred to herein as "A") analyzed 45.7 g. guanidine nitrate, 14.9 g. ammonium thiocyanate, and 0.7 g. thiourea. Rougher tails (referred to herein as "H") analyzed 44.5 g. guanidine nitrate, 60.2 g. ammonium thiocyanate, and 2.1 g. thiourea. "A" included 450 cc. of liquor, "H" 850 cc. "A" was further cleaned to give cleaner concentrate "B" and tails "E." "E" can be recharged to the circuit by adding to rougher tails "I" (see below). "B" was similarly treated to give concentrate "C" and tails "F." "C" analyzed 31.5 g. guanidine nitrate, 0.7 g. ammonium thiocyanate, and 0.1 g. thiourea. The ammonium thiocyanate and thiourea are washed out with pure water to give a 99.9+% pure guanidine nitrate. "F" can be returned to the circuit at "B."

Rougher tails "H" are similarly treated to give concentrate "K" and tails "I." As "K" has approximately the same percentage composition as "A," it is returned to the circuit at "A." "I" is treated to give concentrate "L" and tails "J." "L" is sufficiently close to the composition of "H" to be returned to the circuit at that point. "J" consists of 1.4 g. guanidine nitrate, 39.4 g. ammonium thiocyanate, and 0.8 g. thiourea, equivalent to about 94% ammonium thiocyanate, and thus suitable for most technical purposes.

The solid-and-solution balance of the procedure of this example is set forth in detail in the figure.

Various types of flotation machines such as those commonly employed in the flotation treatment of minerals are available for use in this separation process. It is an advantage of this invention that flotation machines of simple design may be utilized. These machines may be of the mechanical or pneumatic types or may operate on combined mechanical-pneumatic principles.

The separation of guanidine salts from other salts by flotation is not limited to cases involving only pairs. By flotation it is possible to separate one or more guanidine salts from other guanidine salts, or from one or more organic or inorganic salts, all being present as solid particles in aqueous slurry.

This is a continuation-in-part of applicants' copending Serial No. 75,747, now abandoned.

While the invention has been described with particular reference to specific embodiments, it is to be understood that it is not to be limited thereto but is to be construed broadly and restricted solely by the scope of the appended claims.

We claim:
1. A process comprising subjecting an aqueous suspension of a guanidine salt and an inorganic salt to froth flotation, floating said guanidine salt in the thus-formed froth, separating said froth from said suspension, and recovering said guanidine salt therefrom.

2. The method according to claim 1 in which the froth flotation is conducted in the absence of a flotation reagent.

3. A process comprising subjecting an aqueous suspension of a guanidine salt and an inorganic salt to froth floation in the presence of a froth flotation reagent which selectively modifies the surface characteristics of said guanidine salt, floating said guanidine salt in the resulting froth, separating said froth from said suspension, and recovering said guanidine salt therefrom.

4. A process of treating an aqueous slurry containing particles of an undissolved guanidine salt and particles of another undissolved salt, comprising contacting the guanidine salt particles with flotation reagent and floating said guanidine salt particles on the surface of the slurry by froth flotation.

5. A method according to claim 4 in which the guanidine salt particles are subjected to agitation in the presence of the flotation reagent.

6. A method according to claim 4 in which the slurry is subjected to agitation and aeration in the presence of the flotation reagent.

7. In the treatment of a slurry containing undissolved particles of a guanidine salt and an inorganic salt, the step comprising subjecting the slurry to a froth flotation treatment in the presence of a reagent having a preferential affinity for one of said constituents, whereby to induce a selective floating of said guanidine salt to accomplish its separation from the other constituents of the slurry.

8. The process comprising separating particles of guanidine carbonate from particles of sodium chloride by froth flotation of the former, both salts being initially in aqueous suspension.

9. The process comprising separating particles of guanidine sulfate from particles of ammonium sulfate by froth flotation of the former, both salts being initially in aqueous slurry.

10. The process comprising separating particles of guanidine carbonate from particles of sodium sulfate by froth flotation of the former, both salts being initially in aqueous slurry.

11. The process comprising separating particles of guanidine nitrate from particles of ammonium thiocyanate by froth flotation of the former, both salts being initially in aqueous slurry.

KERWIN K. KURTZ.
ROBERT B. BOOTH.

REFERENCES CITED

The following references are of record in the file of this patent:

FOREIGN PATENTS

| Number | Country | Date |
|---|---|---|
| 232,041 | Great Britain | Apr. 15, 1925 |

OTHER REFERENCES

Bureau of Mines, Report of Investigation 3397 (1938), pgs. 15–18.

Taggart, "Handbook of Mineral Dressing," copyright 1945, pgs. 12–02.

Chemical Engineering, July 1948, pages 96, 97 and 98.